United States Patent Office 3,682,759
Patented Aug. 8, 1972

3,682,759
LOW DENSITY PYROLYTIC CARBON
COATING PROCESS
Hans Beutler, Sulz, Switzerland, and Ronald L. Beatty, Seattle, Wash., assignors to Union Carbide Corporation
No Drawing. Filed Mar. 10, 1970, Ser. No. 18,286
Int. Cl. C21c 3/06; C01b 31/04
U.S. Cl. 117—46 CG
6 Claims

ABSTRACT OF THE DISCLOSURE

A process for depositing a low density, highly porous carbon coating on nuclear reactor fuel particles by the thermal decomposition of undiluted exothermic-type cracking gases wherein temperature control of the coating process is obtained by alternately using, as the particle fluidizing medium, the exothermic-type cracking gas and an inert gas to maintain the temperature of the reaction zone between about 1100° C. and 1250° C.

BACKGROUND OF THE INVENTION

Field of the invention

This invention described herein was made in the course of, or under, a contract with the United States Atomic Energy Commission.

This invention relates to processes for depositing low density pyrolytic carbon coatings on articles within a fluidized bed furnace and more specifically to a process for depositing low density, highly porous carbon coatings on nuclear reactor fuel particles wherein an undiluted decomposable carbon-bearing fluidizing gas, exhibiting an exothermic type cracking reaction, is fed to the fluidized bed coating furnace alternately with an inert fluidizing gas.

Description of the prior art

With the growth of nuclear power plant usage throughout the world, the demand for nuclear fuels has increased greatly. To commercially produce nuclear fuel particles, particularly for high temperature operation it is necessary to provide a containment shell for the dispersion-type ceramic fuel materials required for these reactors. Presently, impervious coatings of high density carbon are being deposited on fissionable fuel particles to serve as a containing type shell. However, it is found that when the coated particles are exposed to a high neutron environment, as exists within nuclear reactors, the fuel particles swell sufficiently to crack the carbon coating thereby enabling the fission products to escape. Furthermore, the coating is subjected to fission fragment recoil which may cause cracking of the coating.

It was found from experimentation that if a low density pyrolytic carbon coating was first deposited on a fuel particle and followed thereby by one or more coatings of a high density carbon, the overall coating composite would provide a good containing type shell for the fissionable fuel. The low density coating acts as a spongy volume which contains the fission products, shields the outer coating from fission fragment recoils, and absorbs stresses between the fuel particle and the coating which are due primarily to the aforementioned expansion of the fissionable material.

The low density coating is normally obtained by cracking a thermally decomposable gas under conditions to deposit a coating having the desired characteristics. The cracking of the gas must take place within the bed of the particles being coated, and this is normally accomplished within a fluidized bed furnace. If the deposition temperature is not reached in the bed, no coating is applied to the particles. If the temperature becomes too high, cracking of the gas occurs prematurely in the gas inlet line causing pluggage of the line and disruption of the whole coating operation. While some soot formation is desirable in the process for preparing a very porous coating on the particles, soot particles which are not incorporated into the carbon coatings are deposited on the walls of the furnace thereby resulting in frequent cleaning of the equipment.

When the carbon-containing gas causes an exothermic-type cracking reaction that overrides the effect of the heat capacity of the gas, as when undiluted acetylene is utilized, the temperature of the reaction zone of the coating furnace may vary excessively and cause the above-described problem of premature cracking of the gas. Furthermore, excursions in temperature may cause the deposit of higher density coatings than desired. The desired range of temperature for proper coating conditions employing undiluted acetylene gas was found to be 1100° C. to 1250° C.

One solution advanced to maintain a relatively constant temperature within the reaction zone of a coating chamber entails the diluting of the reactant or carbon bearing gas with an inert gas. This has proved undesirable because the dilution of the reactant gas adversely affects the properties of the coating. For example, the coating resulting from a mixture of reactant gas and inert gas exhibits a relatively high density as compared to the density obtained when only an undiluted reactant gas is employed.

The purpose of this invention is to provide a process in which a controllable low density, highly porous carbon coating can be deposited upon articles such as dispersion-type ceramic fuel particles using an undiluted exothermic-type reactant gas while minimizing the problems formerly encountered.

SUMMARY OF THE INVENTION

This invention is a process for coating articles with a low density carbon deposit in a fluidizing type coating apparatus comprising at least two cycles wherein the articles are alternately contacted with a decomposable carbon bearing gas exhibiting an exothermic-type reaction and an inert gas in a selected temperature range. This temperature range is calculated from the minimum temperature below which soot formation becomes prevalent and the maximum temperature above which cracking of the reactant gas occurs prematurely in the gas inlet line, such range having about a 150° C. spread. It is within this temperature range that soot deposits of minimum densities can be obtained. The term "low density" as used herein applies to a carbon coating having a density less than about 1.4 g./cc. The reactant type fluidizing gas exhibiting the above characteristics is, for example, acetylene, while the inert type fluidizing gas can be selected from a group consisting of helium, argon, and nitrogen.

The optimum temperature for a reaction zone in a fluidizing bed type furnace which is to be used for depositing a low density carbon coating on articles depends upon the particular reactant gas utilized along with the flow rate of such gas. In addition, it has been found that when using undiluted reactant gases, the density of the carbon coating produced therefrom is lower and more efficient than when the reactant gases are mixed with inert gases. Thus, it is of primary importance, in obtaining a low density carbon coating, to decompose an undiluted reactant gas within a temperature regulated reaction zone. The reaction zone is the internal volume of a coating chamber in which the pyrolysis of the carbon bearing gas is to occur. This excludes inlet lines and the like. For example, the optimum temperature range for depositing a low density carbon coating on articles within a fluidized bed furnace in which acetylene gas is used as the fluidizing reactant gas is between about 1100° C. and about 1250° C. In practice, however, when acetylene gas is cracked, an exothermic reaction is produced that tends to cause the temperature to exceed the desired temperature.

To compensate for the temperature excursions caused by the exothermic cracking reaction of certain carbon bearing gases, particularly acetylene, where the heat capacity of the gas does not override the exothermic decomposition, an inert gas is fed alternately with the carbon bearing gas in such a quantity and time duration that it can reduce the temperature buildup within the reaction zone thereby maintaining the thermal decomposition of the reactant gas within the optimum temperature range. This insures that the article to be coated will be contacted with the optimum concentration of undiluted decomposable gas during the deposition period of the process while no deposition occurs during the temperature equilibratory portion of the process when the inert gas is being fed to the furnace.

One important application for this process is the coating of dispersion-type ceramic fuel particles, such as ceramic compounds of actinide elements selected from the group consisting of uranium, thorium and plutonium, with an initial low density carbon coating. This is required since the low density carbon coating provides a spongy volume between the fuel particles and the subsequently applied high density coatings. This, together with the high density coatings offers a good fission gas retention shell type containment means for the dispersion-type fuel particles. This low density coating also prevents the fission fragment recoils from reaching the high density coating as well as providing a free-void volume for fuel swelling.

EXAMPLE

A conventional one-inch diameter fluidized bed coating furnace was employed in several coating runs each of which entailed the coating of 50 grams of thorium oxide microspheres having a diameter of 460 microns. Thorium oxide (ThO₂) is a dispersion type ceramic fuel particle and is used in nuclear reactors. The microspheres were placed in the fluidized bed furnace and, with a thermocouple placed in the coating reaction zone, power was applied to the furnace until the temperature of the reaction zone was raised to about 1150° C. The power was then switched off and various fluidizing gas flow cycles, in which the period for alternately feeding the reactant gas and the inert gas was altered, were tested to provide an indication of the controllability of the temperature within the reaction zone. The reactant gas was acetylene and the inert gas was helium, and the flow rates of the individual gases were 4000 cc./min. or about 6 cc./min./cm.² of ThO₂ surface.

Table I shows four runs each of which was performed to coat 50 grams of thorium oxide microspheres. The coating reaction zone in each run was initially heated to 1150° C. In Run A, the acetylene feed cycle was uninterrupted for 23 seconds and resulted in raising the temperature of the reaction zone to 1270° C. during this time. The acetylene cycle in Run B was "on" for 4 seconds and "off" for 4 seconds (alternating with helium) for a total deposition period of 45 seconds before the temperature of the reaction zone reached 1270° C. The acetylene cycle in Run C was "on" for 4 seconds and "off" for 12 seconds (alternating with helium), and after 40 seconds of deposition the power had to be turned on to prevent the temperature from going too low. In Run D, the acetylene cycle was "on" for 4 seconds and "off" for 8 seconds, also alternating with helium, until a deposition period of 75 seconds had elapsed whereupon the temperature of the reaction zone registered 1050° C.

Evaluation of the temperatures in the reaction zone for these four different coating runs show that a relatively constant temperature, for a particular reactant gas utilized, can be maintained with the reaction zone by selecting the reactant and inert gas cycle periods. Once the precise period of each is selected, programmed value means may be employed to instantaneously open and close gas feed lines to the main inline so as to feed the reactant and inert gases on an alternate basis without loss of fluidization.

This low density carbon coating process, in addition to being used to coat nuclear fuel particles, may be applicable generally to thermochemical vapor deposition methods for coating any article which can withstand the relatively high temperature range required by the decomposable reactant medium.

TABLE I

| Run No. | Acetylene cycle in seconds | | Initial temp. in ° C. | Final temp. in ° C. | Overall deposition time in seconds |
| --- | --- | --- | --- | --- | --- |
| | On | Off | | | |
| A | 23 | | 1,150 | 1,270 | 23 |
| B | 4 | 4 | 1,150 | 1,270 | 45 |
| C* | 4 | 12 | 1,150 | 1,110 | 80 |
| D | 4 | 8 | 1,150 | 1,050 | 75 |

*Power turned on after.

What is claimed is:

1. A process for depositing a low density carbon coating on nuclear fuel type particles within a fluidized bed furnace using acetylene as the decomposable fluidizing gas within a temperature range between about 1110° C. and about 1250° C., comprising the steps:
   (a) heating a reaction zone of a fluidized bed furnace containing nuclear fuel type particles to a temperature between about 1100° C. and 1250° C.
   (b) feeding acetylene as the fluidizing gas into said reaction zone for a time period sufficient for depositing a coating of carbon from said gas on said particles within said furnace but insufficient for increasing the temperature above about 1250° C. due to the exothermic characteristics of acetylene, said time period being below about 23 seconds;
   (c) terminating said fluidizing acetylene gas feeding when the temperature within the reaction zone increases to above about 1250° C.;
   (d) feeding a fluidizing inert gas into said reaction zone for a time period sufficient to equilibrate the temperature within said reaction zone to between about 1100° C. and 1250° C.; and
   (e) repeating steps (b) through (d) at least once until a coating of carbon having a density less than about 1.4 g./cc. is obtained.

2. The process of claim 1 wherein said inert gas is selected from a group consisting of helium, argon, nitrogen.

3. The process of claim 1 wherein said acetylene gas and said inert gas are alternated instantaneously to prevent loss of fluidization.

4. The process of claim 1 wherein said particles to be coated are dispersion-type ceramic fuel particles for nuclear reactors.

5. The process of claim 1 wherein said particles to be coated are ceramic compounds of actinide elements selected from the group consisting of uranium, thorium and plutonium.

6. The process of claim 1 wherein said particles to be coated are thorium dioxide particles.

References Cited

UNITED STATES PATENTS

| | | | |
|---|---|---|---|
| 3,335,063 | 8/1967 | Goeddel et al. | 117—46 CG |
| 3,247,008 | 4/1966 | Finicle | 117—46 CG |
| 3,301,763 | 1/1967 | Beatty et al. | 177—46 CG |
| 3,471,314 | 10/1969 | Beatty et al. | 117—46 CG |
| 3,231,408 | 1/1966 | Huddle | 117—46 CG |
| 3,375,307 | 3/1968 | Blum | 117—46 CG |
| 3,472,677 | 10/1969 | Beutler | 176—91 |

WILLIAM D. MARTIN, Primary Examiner

M. S. FOCLEOUS, Assistant Examiner

U.S. Cl. X.R.

117—100 B, DIG 6, 119.2; 176—91; 260—0.5